(12) United States Patent
Park et al.

(10) Patent No.: US 9,304,330 B2
(45) Date of Patent: Apr. 5, 2016

(54) EXPERIENTIAL OPTICAL DEVICE

(71) Applicant: TRANSITIONS OPTICAL, INC., Pinellas Park, FL (US)

(72) Inventors: David Park, Tuam (IE); Kevin J. Stewart, Palm Harbor, FL (US); Anil Kumar, Murrysville, PA (US)

(73) Assignee: Transitions Optical, Inc., Pinellas Park, FL (US)

(*) Notice: Subject to any disclaimer, the term of this patent is extended or adjusted under 35 U.S.C. 154(b) by 0 days.

(21) Appl. No.: 14/184,151

(22) Filed: Feb. 19, 2014

(65) Prior Publication Data

US 2014/0232978 A1     Aug. 21, 2014

Related U.S. Application Data

(60) Provisional application No. 61/766,978, filed on Feb. 20, 2013.

(51) Int. Cl.
*G02C 9/00* (2006.01)
*G02C 7/10* (2006.01)
*G02C 7/12* (2006.01)
*G02C 7/08* (2006.01)
*G02C 9/04* (2006.01)

(52) U.S. Cl.
CPC ............ *G02C 9/00* (2013.01); *G02C 7/086* (2013.01); *G02C 7/102* (2013.01); *G02C 7/12* (2013.01); *G02C 9/04* (2013.01)

(58) Field of Classification Search
CPC ............ G02C 7/08; G02C 7/086; G02C 7/10; G02C 7/102; G02C 7/108; G02C 7/12; G02C 2202/16
USPC ............ 351/44, 47, 49, 159.6, 159.61, 159.66
See application file for complete search history.

(56) References Cited

U.S. PATENT DOCUMENTS

| | | | |
|---|---|---|---|
| 5,502,516 A * | 3/1996 | Elterman | 351/47 |
| 7,256,921 B2 | 8/2007 | Kumar et al. | |
| 7,884,992 B1 * | 2/2011 | Wang et al. | 359/241 |
| 7,938,536 B2 | 5/2011 | Cano et al. | |
| 2008/0062378 A1 | 3/2008 | McCracken | |
| 2010/0007847 A1 * | 1/2010 | Cano et al. | 351/166 |
| 2011/0181828 A1 | 7/2011 | Yi et al. | |

FOREIGN PATENT DOCUMENTS

FR        2907922 A1    5/2002
WO   2013006153 A1    1/2013

* cited by examiner

*Primary Examiner* — Huy K Mai
(74) *Attorney, Agent, or Firm* — The Webb Law Firm

(57) ABSTRACT

The invention provides a multi-layer experiential optical device including at least one polymeric layer having a first side and an opposing second side, and having a light-influencing property; and a low tack pressure sensitive adhesive layer applied on at least a peripheral zone of the second side of the polymeric layer. The experiential optical device is reversibly adherent to an optical lens.

10 Claims, 1 Drawing Sheet

EXPERIENTIAL OPTICAL DEVICE

CROSS REFERENCE TO RELATED APPLICATIONS

This application claims the benefit of priority of U.S. Provisional Application No. 61/766,978, filed Feb. 20, 2013, which is incorporated by reference herein in its entirety.

FIELD OF THE INVENTION

The invention relates to a multi-layer experiential optical device which is reversibly adherent to an optical lens.

BACKGROUND OF THE INVENTION

Corrective eyewear, such as spectacle lenses, are available with a variety of optional functionalities such as photochromism, polarization, fixed tint and the like. These optional functionalities serve to protect the eye, for example, from damaging radiation or excessive glare. Additionally, a variety of combinations of the optional functionalities are also possible. These features are often incorporated into an optical lens either during manufacture of the processing of the lens itself. In the manufacture of photochromic lenses, the photochromic dyes may be incorporated into the lens material, into a laminated layer, as an overmold layer, or into a lens coating. Likewise, polarization functionality may be incorporated via a laminated layer within the lens material, or as an overmold layer. U.S. Pat. No. 7,256,921 describes a process whereby both photochromism and dichroism may be induced by actinic radiation. Due to the complex and expensive processing involved, these optional functionalities can add significant cost to the spectacle wearer.

WO2013/006153 describes an optical patch to temporarily convert clear lenses to photochromic lenses. The patch can be conformed to the surface of an opthalmic lens. This process requires treatment with a lubricant, heat, or extended time to allow the patch to conform to the lens surface. Care must be taken to avoid optical irregularities such as air entrapment. The patch is limited in functionality to photochromism.

There remains a need for an easy to apply device to demonstrate the benefit of a variety of available optional functionalities, including light-influencing properties, on the quality of vision to spectacle wearers prior to purchase.

SUMMARY OF THE INVENTION

The present invention is directed to a multi-layer experiential optical device comprising: (a) a first polymeric layer having a first side and an opposing second side; (b) at least one layer having a [light-influencing property] adjacent to the second side of (a); (c) a second polymeric layer, which is the same or different from the first poly layer (a), having a first side and an opposing second side, wherein the first side is adjacent to the layer (b); and (d) a low tack pressure sensitive adhesive disposed on at least a peripheral zone of the second side of (c). The experiential optical device is reversibly adherent to an optical lens.

Further the present invention provides multi-layer experiential optical device comprising: at least one polymeric layer having a first side and an opposing second side, and having a light-influencing property; and a low tack pressure sensitive adhesive layer disposed on at least a peripheral zone of the second side of the polymeric layer. The experiential optical device is reversibly adherent to an optical lens.

Additionally, the present invention is directed to a multi-layer experiential optical device comprising: (A) a first polymeric layer having a first side and an opposing second side; (B) at least one second polymeric layer which is the same or different from the first polymeric layer (A), and having a first side and an opposing second side, wherein the first side of layer (B) is adjacent to the second side of layer (A) (C) optionally, an adhesive layer interposed between the first polymeric layer (A) and the second polymeric layer (B), and (D) a low tack pressure sensitive adhesive layer disposed on at least a peripheral zone of the second side of the polymeric layer (B). At least one of the layers (A), (B) and (C) has a light-influencing property, and the experiential optical device is reversibly adherent to an optical lens.

BRIEF DESCRIPTION OF THE DRAWINGS

In FIGS. 1 and 2 like characters refer to the same structural features and/or components, as the case may be, unless otherwise stated.

DETAILED DESCRIPTION OF THE INVENTION

Figure 1:
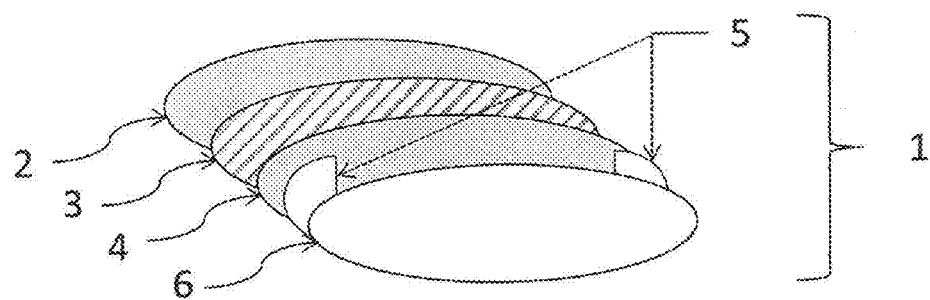
FIG. 1 is a schematic exploded view of a multi-layer experiential optical device representative of some embodiments of the present invention.

Various non-limiting embodiments disclosed herein relate to a multi-layer experiential optical device. For example, in one embodiment said experiential device comprises: (a) a first polymeric layer having a first side and an opposing second side: (b) at least one layer having a light-influencing property adjacent to the second side of (a); (c) a second polymeric layer, which is the same or different from the first polymeric layer (a), having a first side and an opposing second side, wherein the first side is adjacent to the layer (b); and (d) a low tack pressure sensitive adhesive disposed on at least a peripheral zone of the second side of (c), wherein the experiential optical device is reversibly adherent to an optical lens.

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light-of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

As previously mentioned, the present invention is directed to a multi-layer experiential optical device comprising at least (a) a first polymeric layer having a first side and an opposing second side, (b) at least one layer having a light-influencing property adjacent to the second side of (a), (a) a second polymeric layer, which is the same or different from the first polymeric layer (a), having a first side and an opposing second side, wherein the first side is adjacent to the layer (b), and (d) a low tack pressure sensitive adhesive disposed on at least a peripheral zone of the second side of (a), wherein the experiential optical device is reversibly adherent to an optical lens.

The term experiential optical device' means an optical device used in conjunction with optical lenses (i.e., plano or prescription lenses) which allows the lens wearer to experience various light-influencing properties on a temporary basis.

The term "light-influencing property" or similar terms means that the indicated material, e.g., film layer, is capable of modifying by absorption (or filtering) of incident light-radiation, e.g., visible, ultraviolet (UV) and/or infrared (IR) radiation that impinges on the material. In alternate embodiments, the light-influencing property can be light-polarization, e.g., by means of a polarizer and/or dichroic dye; a change in light-absorption properties, e.g., by use of a chromophore that changes color upon exposure to actinic radiation, such as a photochromic material; transmission of only a portion of the incident light-radiation, e.g., by use of a fixed tint such as a conventional dye; or by a combination of one or more of such light-influencing functions.

As used herein the term "linearly polarize" means to confine the vibrations of the electric vector of light-waves to one direction or plane. As used herein the term "dichroic" means capable of absorbing one of two orthogonal plane polarized components of at least transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. That is, due to the random positioning of the molecules of the dichroic material, selective absorption by the individual molecules will cancel each other such that no net or overall linear polarizing effect is achieved. Thus, it is generally necessary to suitably position or arrange the molecules of the dichroic material in order to achieve a net linear polarization.

As used herein the term "photochromic" means having an absorption spectrum for at least visible radiation that varies in response to at least actinic radiation. Thus, conventional photochromic elements are generally well suited for use in both low-light-and bright conditions. It should be mentioned that conventional photochromic elements (that do not include linearly polarizing filters) are generally not adapted to linearly polarize radiation. That is, the absorption ratio of conventional photochromic elements, in either state, is generally less than two (2). As used herein the term "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance. Therefore, conventional photochromic elements typically cannot reduce reflected light-glare to the same extent as conventional linearly polarizing elements.

The experiential optical device of the present invention comprises a first polymeric layer (a).

The first polymeric layer (a) and/or the second polymeric layer (c) can comprise a polymeric film comprised of any of a wide variety of film materials, including thermoset and thermoplastic materials provided the material is transparent or optically clear. For example, the polymeric layers (a) and/or (c) can comprise polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly (vinyl alcohol), polyvinyl chloride), poly(vinylidene chloride), poly(ethylene terephthalate), polyester, polysulfone, polyolefin, copolymers thereof, or mixtures thereof. In a particular embodiment of the present invention, the polymeric layers (a) and/or (c) can comprise poly(ethylene terephthalate).

In a particular embodiment of the present invention, either of both of the polymeric layers (a) and/or (c) is linearly polarizing and comprises a polymeric component comprising poly(vinyl alcohol), polyvinyl butyral), polyethylene terephthalate, cellulose acetate butyrate, cellulose diacetate, cellulose triacetate, polyurethane, polyether, polyester, polyamide, polyalkyl(meth)acrylate, mixtures thereof and/or copolymers thereof.

Further, polymeric layers (a) and/or (c) can be linearly polarizing and may comprise an optical film comprised of a disperse phase of polymeric particles disposed within a continuous birefringent matrix which can be oriented in one or more directions. The size and shape of the disperse phase particles, the volume fraction of the disperse phase, the film thickness and the amount of orientation are chosen to attain a desired degree of diffuse reflection and total transmission of radiation of a desired wavelength in the film. Such films and their preparation are described in U.S. Pat. No. 5,867,316 at column 6, line 47, to column 20, line 51, the cited portion of which is incorporated herein by reference.

Also, either of both of the polymeric layers (a) and/or (c) can be linearly polarizing and can comprise oriented film of polyvinyl alcohol, vinyl butyral, polyethylene terephthalate, polyalkyl(meth)acrylate, polyamide, poly(amide-ether) block copolymers, poly(ester-ether) block copolymers, poly (ether-urethane) block copolymers, poly(ester-urethane) block copolymers, and/or poly(ether-urea) block copolymers. The term "oriented film" as used in conjunction with linearly polarizing polymeric layers (a) and/or (c), means that the film has at least a first general direction (of alignment) such that one or more other structures or components comprising the sheet are positioned or suitably arranged along that same general direction. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

Either of both of the polymeric layers (a) and/or (c) may have an optical power. The polymeric layer (a) can have any refractive index required. In a particular embodiment, the first polymeric layer (a) has regions of differing optical power, such as in a multi-focal or progressive lens.

The experiential optical device of the present invention further comprises at least one layer (b) having a light-influencing property. In a particular embodiment the layer (b) is adjacent to the second side of polymeric layer (a). The layer (b) having a light-influencing property can comprise a soft polymeric matrix, such as a gel or adhesive with a photochromic material or photochromic-dichroic material. Suitable materials may comprise a variety of gels or adhesives, including but not limited to polyvinyl ethers, acrylic adhesives, poly-alpha-olefins, and silicone adhesives, as well as blends thereof. Examples of suitable adhesives are described in PCT/

US2003/025690, from the second paragraph of page 6 to the second paragraph of page 8 inclusive.

In a particular embodiment, the layer (b) comprises a photochromic material. As used herein, the term "photochromic material" includes both thermally reversible and non-thermally reversible (or photo-reversible) photochromic compounds.

The photochromic material can comprise any of a variety of organic and inorganic photochromic materials. The photochromic material(s) can include but is not limited to the following classes of materials: chromenes, e.g., naphthopyrans, benzopyrans, indenonaphthopyrans, phenanthropyrans or mixtures thereof; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzaxazines, spiro(benzindoline)naphthoxazines and spiro(indoline)benzoxazines; mercury dithizonates, fulgides, fulgimides and mixtures of such photochromic compounds.

Such photochromic materials and complementary photochromic materials are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, *Techniques in Chemistry*, Volume III, "Photochromism" Chapter 3, Glenn H. Brown, Editor, John Wiley and Sons, Inc., New York, 1971.

The photochromic materials also can be polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spiroberizothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and in U.S. Pat. No. 6,555,028 at column 1, line 16 to column 24, line 56. The disclosures of the aforementioned patents on polymerizable photochromic materials are incorporated herein by reference.

Other suitable photochromic materials can include organo-metal dithiozonates, e.g., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

The light-influencing material may comprise a photochromic-dichroic material. As used herein with respect to the photochromic compounds described herein, the term "photochromic-dichroic" means displaying both photochromic and dichroic (i.e., linearly polarizing) properties under certain conditions, which properties are at least detectable by instrumentation.

Accordingly, "photochromic-dichroic compounds" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation, and are capable of absorbing one of two orthogonal plane polarized components of at least transmitted radiation more strongly than the other (i.e., capable of exhibiting dichroism. Additionally, as with conventional photochromic compounds discussed herein below, the photochromic-dichroic compounds disclosed herein can be thermally reversible. That is, the photochromic-dichroic compounds can switch from a first state to a second state in response to actinic radiation and revert back to the first state in response to thermal energy.

For example, the photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Examples of photochromic-dichroic compounds suitable for use in the present invention can include, but are not limited, to those described in detail in U.S. Patent Application Publication No. 2005/0012998A1 at paragraphs [0089] to [0339], which disclosure is incorporated herein by reference.

The photochromic or photochromic-dichroic material may be admixed with the soft polymer matrix by any conventional method, such as physical admixing, extruding, casting, etc. In another embodiment, the layer (b) may comprise a free standing film comprising a light-influencing property.

In a particular embodiment, the experiential optical device may comprise an optional polarizing layer interposed between layers (a) and (b) and/or between layers (b) and (c). The optional polarizing layer can be any of the polarizing layers described above.

The experiential optical device can further comprise a second polymeric layer (c), having a first side and an opposing second side. In one embodiment, said first side is adjacent to the layer (b). The second polymeric layer can be the same or different from the first polymeric layer (a) as described above.

The experiential optical device of the present invention further comprises a low tack pressure sensitive adhesive (PSA) disposed on at least a peripheral zone of the second side of layer (c). The low tack PSA is selected such that the adhesive is reversibly adherent to the surface of an optical lens. Upon removal of the experiential optical device from the optical lens, the low tack PSA is substantially released from the surface of the optical lens, thus imparting no optical aberration to the surface of an optical lens and leaving no observable adhesive residue on the surface.

Non-limiting examples of the low tack PSA used in the present invention include adhesives such as polyvinyl ethers, acrylic adhesives, poly-alpha olefins, and silicone adhesives, as well as blends thereof. In one non-limiting embodiment the low tack PSA comprises an acid free acrylate based pressure sensitive adhesive. In a particular embodiment, the low tack PSA exhibits a peel strength of between 0.5 N/25 mm to 3.5 N/25 mm as determined using FINAT Test Method FTM 1.

The low tack pressure sensitive adhesive layer (d) can be provided as a multilayer film where there is a polymeric layer (support film) interposed between the low tack pressure sensitive adhesive layer and a high tack adhesive layer. The low tack pressure sensitive adhesive layer (d) is adapted to reversibly adhere to an optical lens surface as described below, while the high tack adhesive layer is adapted to remain adherent to the polymeric layer (c). Examples of suitable high tack adhesives include but are not limited to thermally curable acrylic urethane adhesives and photocurable acrylate adhesives as are well known in the art. Further, the peel strength of the high tack adhesive suitable for use in the present invention is relative to the peel strength of the low tack adhesive such that when the experiential optical device is removed from the surface of the eyeglass lens(es) to which it is affixed, the low tack adhesive is easily removed from the lens surface leaving no noticeable residue, while the high tack adhesive maintains the integrity of the adhesion between the polymeric support film and the polymeric layer (c). Typically, the peel strength of the high tack adhesive is at least 5 N/25 mm greater than the peel strength of the low tack adhesive.

The low tack pressure sensitive adhesive (d) is disposed on at least a peripheral zone of the second side of layer (c). The peripheral zone(s) may be any peripheral zone enabling reversible adhesion to an optical lens and which does not substantially interfere with the vision of the lens wearer. In a particular embodiment, the experiential optical device comprises a temporal peripheral zone and a nasal peripheral zone. As used herein, the term "temporal peripheral zone" means the area of the experiential optical device on the outer periphery of the device which, when applied to an eyeglass lens, is closest to the eyeglass wearer's temple. The term "nasal peripheral zone" means the area of the experiential optical device on the inner periphery of the device which, when applied to an eyeglass lens, is closest to the bridge of the eyeglass wearer's nose. Refer to the description of FIG. 2 herein below. In a non-limiting embodiment, the experiential optical device of the present invention may be cut into shapes to approximate the geometry of various optical lenses, such as ophthalmic lenses. Any film converting technique known in the art may be used. Non-limiting examples of such techniques include die cutting, kiss cutting or laser cutting. Prior to cutting, the low tack pressure sensitive adhesive (d) may be applied to the second side of (c) in strips. Such strips may vary in width, provided that when the shapes mentioned above are cut, the low tack PSA covers an area of the peripheral zone(s) sufficient to affix the experiential optical device to the lens surface. The experiential optical device may further comprise a removable liner reversibly adherent to the low tack pressure sensitive adhesive (d). The liner may match the shape and size of the experiential optical device or it may extend beyond the shape and size of the article. Separate removable liners may be used for each of the peripheral zones comprising low tack PSA. The removable liner(s) may comprise a transparent film liner or a paper liner. The removable liner(s) may further comprise a pull tab extending beyond the low tack PSA to facilitate removal of the liner.

Referring now to FIG. 1, one embodiment of the multilayer experiential optical device 1 is shown in FIG. 1, which illustrates an exploded view of the layers that may be present. The first polymeric layer 2 is adjacent to a layer 3 having a light-influencing property. A second polymeric layer 4 is adjacent the opposite side of layer 3. Layers 2, 3, and 4 may comprise a laminate in which layer 3 further comprises a laminating adhesive. Low tack pressure sensitive adhesive 5 is disposed on either or both of the peripheral sides of the surface of layer 4 opposite the layer 3. An optional removable liner is shown, which is reversibly adherent to the adhesive 5, and may serve to protect the adhesive properties of 5, as well as protect the surface of layer 4 from scratches and other defects resulting from handling.

Figure 2:
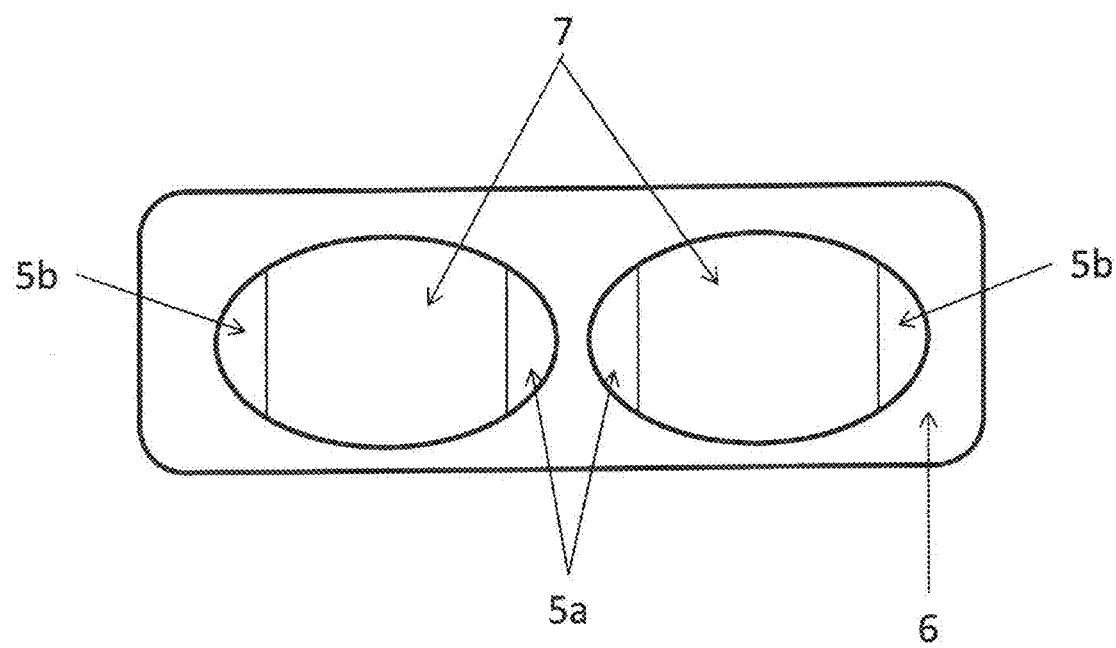
FIG. 2 is a representative view of one embodiment of the present invention as it may be provided to an end user.

Referring now to FIG. 2, in a particular embodiment of the present invention, the experiential optical device may be provided as a pair to the end user. FIG. 2 illustrates one embodiment in which a pair of experiential optical devices 7, are provided on a removable liner, 6. The optical devices are arranged such that a user may apply to a pair of optical eyeglasses in the orientation provided. That is, with low tack pressure sensitive adhesive located in the nasal peripheral zone 5a, and the temporal peripheral zone 5b.

As previously mentioned, the present invention further provides a multi-layer experiential optical device comprising: at least one polymeric layer having a first side and an opposing second side, and having a light-influencing property; and a low tack pressure sensitive adhesive layer disposed on at least a peripheral zone of the second side of the polymeric layer. The experiential optical device is reversibly adherent to an optical lens. The polymeric layer as well as the low tack pressure sensitive adhesive layer can comprise any of the respective polymer layers and low tack pressure sensitive adhesive layers mentioned herein above.

Additionally, the present invention is directed to a multi-layer experiential optical device comprising. (A) a first polymeric layer having a first side and an opposing second side; (B) at least one second polymeric layer which is the same or different from the first polymeric layer (A), and having a first side and an opposing second side, wherein the first side of layer (B) is adjacent to the second side of layer (A); (C) optionally, an adhesive layer interposed between the first polymeric layer (A) and the second polymeric layer (B), and (D) a low tack pressure sensitive adhesive layer disposed on at least a peripheral zone of the second side of the polymeric layer (B). At least one of the layers (A), (B) and (C) has a light-influencing property. The experiential optical device is reversibly adherent to an optical lens. The polymeric layers (A) and (B) can comprise any of those previously described. The optional adhesive layer (C) can comprise any of the art-recognized laminating adhesives; and the low tack pressure sensitive adhesive layer (D) can comprise any of the aforementioned low tack adhesives.

The present invention is more particularly described in the following examples, which are intended to be illustrative only, since numerous modifications and variations therein will be apparent to those skilled in the art. Unless otherwise specified, all parts and all percentages are by weight.

EXAMPLES

Example 1

Laboratory Preparation of Photochromic Films

TABLE 1

| Formulation | PC Dye A[1] | PC Dye B[2] | PC Dye C[3] | PC Dye D[4] | IRGANOX ® 245[5] |
|---|---|---|---|---|---|
| 1 | 0.1537 | 0.1590 | 0.2173 | — | .133 |
| 2 | 0.1537 | — | 0.2173 | 0.1590 | .133 |
| 3 | 0.5300 | — | — | — | .133 |
| 4 | — | 0.5300 | — | — | .133 |
| 5 | — | — | 0.5300 | — | .133 |
| 6 | — | — | — | 0.5300 | .133 |
| 7 | — | 0.05406 | 0.20564 | 0.2703 | .133 |

[1] 3-phenyl-3-(4-morpholinophenyl)-13,13-dimethyl-indeno[2',3':3,4]naphtho[1,2-b]pyran.
[2] 3-(4-morpholinophenyl)-3-(4-butoxyphenyl)-13,13-dimethyl-indeno[2',3':3,4]naphtho[1,2-b]pyran.
[3] A photochromic dye as synthesized in Example D of U.S. Pat. No. 6,296,785.
[4] 3-(4-methoxyphenyl)-3-(4-butoxyphenyl)-6-methoxy-13,13-dimethyl-indeno[2',3':3,4]naphtho[1,2-b]pyran.
[5] An antioxidant available from BASF The components of each of the formulations 1-7 listed in Table 1 above were dissolved in 8.49 ethyl acetate, heated to 60° C. and stirred until complete dissolution was observed. The dye solutions were then mixed into a proprietary curable acid free acrylic laminating adhesive. Each blend was mixed thoroughly with a magnetic stirrer for 15 minutes.

Sections measuring 5 cm$^2$ of polyethylene terephthalate ("PET") film were spin-coated with each of the adhesive blends at a slow spin rate of 500 rpm for 5 seconds and a fast spin rate of 1100 rpm for 5 seconds in order to achieve a dry film thickness of 25 μm.

The films were cured for 5 minutes at 140° C. in a laboratory scale oven, and subsequently cooled to ambient temperature. The films were then laminated to a second sheet of PET film using a Model LL100 Laboratory Laminator, manufactured by ChemInstruments, Inc, using a laminating speed setting of 5 and a laminating pressure of 30 psi.

Oval shapes were cut from the section of the resulting laminate using a hand operated cutting press. The oval films were exposed to a UV arc lamp light source at an irradiance level of 6.7 W/m$^2$, at which time is was noted that the films changed from a relatively clear and colorless state to a tinted and colored state. The samples returned to a relatively clear and colorless state upon removal of the UV light source.

Example 2

Preparation of Self-Adhesive Experiential Photochromic Ovals

Size A4 sheets of proprietary photochromic PET laminate were cut into ovals using a hand operated cutting press as in Example 1. Size A4 double faced adhesive was obtained with opposing high tack and low tack surfaces. Thin strips of the double faced adhesive were cut, and the protective release liner was removed from the higher tack side of the transfer adhesive. The adhesive strips were subsequently applied by hand to the nasal peripheral and the temporal peripheral zones of the ovals such that the maximum coverage of each of the peripheral zones measured 3 mm from the edge of the oval. The high tack adhesive adhered to the PET laminate exhibited a peel strength of 6.3N125 mm as measured according to FINAT Test Method FTM 1. The excess adhesive film extending beyond the edge was removed using a razor blade.

Example 3

Adherence of Experiential Photochromic Ovals to Optical Lenses

The ovals from Example 2 were subsequently applied to two different optical lenses, namely allyldiglycol carbonate lens material, and allyldiglycol carbonate lenses coated with Essilor TRIO® antireflective, coating, available from Essilor International. The ovals remained adhered to the lenses for 17 days after which time they were removed from the front of the lens by peeling. The lenses were subsequently inspected for any observable visual defect as a result of the adhesive. It was noted that there was no residual adhesive as well as no visual defects observable on any of the lenses when inspected using a strip light inspection method. The peel strength of the low tack adhesive to optical lenses was measured to be 0.8N/25 mm according to FINAT Test Method FTM 1.

The present invention has been described with reference to specific details of particular embodiments thereof. It is not intended that such details be regarded as limitations upon the scope of the invention except insofar as and to the extent that they are included in the accompanying claims.

We claim:

1. A multi-layer experiential optical device comprising:
   (a) a first polymeric layer having a first side and an opposing second side;
   (b) at least one layer having a light-influencing property adjacent to the second side of the layer (a);
   (c) a second polymeric layer, having a same composition as the first polymeric layer (a) or a different composition from the first polymeric layer (a), having a first side and an opposing second side, wherein the first side is adjacent to the layer (b); and
   (d) a low tack pressure sensitive adhesive disposed on at least a peripheral zone of the second side of the layer (c), wherein the experiential optical device is reversibly adherent to an optical lens.

2. The experiential optical device of claim 1, wherein the experiential optical device is sized and shaped to be reversibly affixed to the outside of an optical lens.

3. The experiential optical device of claim 2, wherein the experiential optical device has a temporal peripheral zone and a nasal peripheral zone, and wherein the low tack pressure sensitive adhesive (d) is disposed in both the temporal peripheral zone and the nasal peripheral zone.

4. The experiential optical device of claim 1, further comprising a removable liner reversibly adherent to the low tack pressure sensitive adhesive (d).

5. The experiential optical device of claim 1, wherein the first polymeric layer (a) and/or second polymeric layer (c) comprises polyamide, poly(amide-ether) block copolymers, poly(ester-ether) block copolymers, polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, or mixtures thereof.

6. The experiential optical device of claim 1, wherein the at least one layer having a light-influencing property (b) comprises a photochromic material.

7. The experiential optical device of claim 1, wherein the at least one layer having a light-influencing property (b) comprises a photochromic-dichroic material.

8. The experiential optical device of claim 6, further comprising a linearly polarized layer interposed between layers (a) and (b) or between layers (b) and (c), wherein the low tack pressure sensitive adhesive (d) comprises polyvinyl ether adhesives, acrylic adhesives, poly-alpha olefin adhesives, and/or silicone adhesives.

9. A multi-layer experiential optical device comprising:

at least one polymeric layer having a first side and an opposing second side, and having a light-influencing property; and a low tack pressure sensitive adhesive layer disposed on at least a peripheral zone of the second side of said polymeric layer, wherein the experiential optical device is reversibly adherent to an optical lens.

10. A multi-layer experiential optical device comprising:

A. a first polymeric layer having a first side and an opposing second side;

B. at least one second polymeric layer having a same composition as the first polymeric layer (A) or a different composition from the first polymeric layer (A), and having a first side and an opposing second side, wherein the first side of layer (B) is adjacent to the second side of layer (A); and C. optionally, an adhesive layer interposed between the first polymeric layer (A) and the second polymeric layer (B), D. a low tack pressure sensitive adhesive layer disposed on at least a peripheral zone of the second side of the polymeric layer (B), wherein at least one of the layers (A), (B) and (C) has a light-influencing property, and wherein the experiential optical device is reversibly adherent to an optical lens.

* * * * *